(12) United States Patent
Sawai et al.

(10) Patent No.: US 11,616,887 B2
(45) Date of Patent: Mar. 28, 2023

(54) IMAGE PROCESSING DEVICE AND IMAGE FORMING DEVICE

(71) Applicant: FUJIFILM BUSINESS INNOVATION CORP., Tokyo (JP)

(72) Inventors: Kenji Sawai, Kanagawa (JP); Shogo Tanaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 267 days.

(21) Appl. No.: 16/933,408

(22) Filed: Jul. 20, 2020

(65) Prior Publication Data

US 2021/0289094 A1    Sep. 16, 2021

(30) Foreign Application Priority Data

Mar. 16, 2020  (JP) .............................. JP2020-045387

(51) Int. Cl.
*H04N 1/00*     (2006.01)

(52) U.S. Cl.
CPC ..... *H04N 1/00702* (2013.01); *H04N 1/00785* (2013.01); *H04N 1/00639* (2013.01)

(58) Field of Classification Search
CPC ........... H04N 1/00702; H04N 1/00785; H04N 1/00639
USPC .......................................................... 382/112
See application file for complete search history.

(56) References Cited

U.S. PATENT DOCUMENTS

| | | | | |
|---|---|---|---|---|
| 2009/0121407 A1* | 5/2009 | Kawamura | ........ | G03G 15/6538 270/32 |
| 2014/0293304 A1* | 10/2014 | Seto | ........................ | G06T 11/60 358/1.12 |
| 2018/0159989 A1* | 6/2018 | Mizuno | ................ | G03G 15/234 |
| 2018/0359383 A1 | 12/2018 | Tada | | |
| 2019/0230245 A1* | 7/2019 | Kurokawa | ............. | G06K 15/16 |
| 2020/0167108 A1* | 5/2020 | Yamamoto | ............... | B65H 7/06 |

FOREIGN PATENT DOCUMENTS

| | | |
|---|---|---|
| JP | 2008-213962 A | 9/2008 |
| JP | 2018-207398 A | 12/2018 |

* cited by examiner

*Primary Examiner* — Gabriel I Garcia
(74) *Attorney, Agent, or Firm* — Oliff PLC

(57) ABSTRACT

An image processing device includes: a processor configured to obtain a positional deviation amount of an actual folding line from an expected folding line on a test sheet, and generate, based on the positional deviation amount, sheet image information including image data representing an image to be formed on a sheet, so as to change a position of the image.

9 Claims, 10 Drawing Sheets

FIG. 11

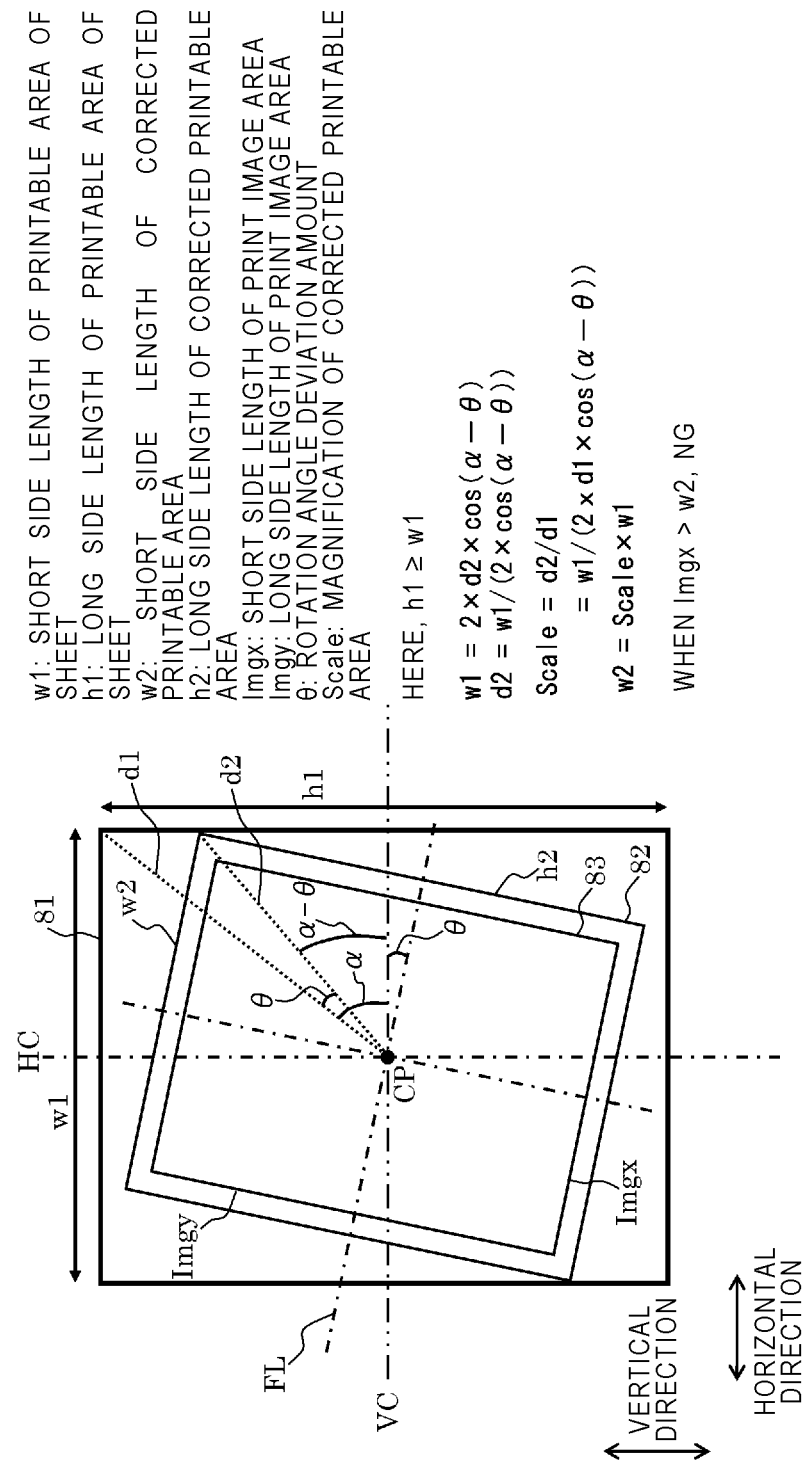

w1: SHORT SIDE LENGTH OF PRINTABLE AREA OF SHEET
h1: LONG SIDE LENGTH OF PRINTABLE AREA OF SHEET
w2: SHORT SIDE LENGTH OF CORRECTED PRINTABLE AREA
h2: LONG SIDE LENGTH OF CORRECTED PRINTABLE AREA
Imgx: SHORT SIDE LENGTH OF PRINT IMAGE AREA
Imgy: LONG SIDE LENGTH OF PRINT IMAGE AREA
θ: ROTATION ANGLE DEVIATION AMOUNT
Scale: MAGNIFICATION OF CORRECTED PRINTABLE AREA HERE, h1 ≥ w1

$w1 = 2 \times d2 \times \cos(\alpha - \theta)$
$d2 = w1/(2 \times \cos(\alpha - \theta))$ Scale = d2/d1
     = $w1/(2 \times d1 \times \cos(\alpha - \theta))$ w2 = Scale × w1

WHEN Imgx > w2, NG

IMAGE PROCESSING DEVICE AND IMAGE FORMING DEVICE

CROSS-REFERENCE TO RELATED APPLICATIONS

This application is based on and claims priority under 35 USC 119 from Japanese Patent Application No. 2020-045387 filed Mar. 16, 2020.

BACKGROUND

1. Technical Field

The present disclosure relates to an image processing device and an image forming device.

2. Related Art

Automatic folding devices (hereinafter, simply referred to as folding devices) perform a folding process for a sheet. Whether a position of a folding line of the folded sheet is deviated from a desired position is also verified. For example, the position of the folding line can be detected and confirmed by unfolding the folded sheet and reading the sheet with an image reading device.

JP-A-2018-207398 discloses an image reading device including a light receiver, a first light emitting unit, and a second light emitting unit. The light receiver receives reflected light from a document that is folded and then opened to obtain an image. The first light emitting unit and the second light emitting unit are respectively disposed upstream and downstream of the light receiver in a document reading direction with the light receiver interposed between the first light emitting unit and the second light emitting unit. A position of a fold of the document is specified by comparing a first image obtained by reading the document in a state where light is emitted from only the first light emitting unit with a second image obtained by reading the document in a state where light is emitted from only the second light emitting unit.

JP-A-2008-213962 discloses that in order to improve punching position accuracy when a Z-folded sheet is to be punched, before punching, the transported Z-folded sheet is switched back to abut against an upstream transport roller so as to perform skew correction.

SUMMARY

In a case where an image is formed on a sheet and a folding process is performed to output a printed matter, when a folding position of the sheet is deviated from a desired position, it is common to adjust a folding device. However, it may not be easy to adjust the folding device because of a complicated mechanism of the folding device or the like.

Aspects of non-limiting embodiments of the present disclosure relate to adjusting a folding position even when a folding position is deviated from a desired position.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing device including: a processor configured to obtain a positional deviation amount of an actual folding line from an expected folding line on a test sheet, and generate, based on the positional deviation amount, sheet image information including image data representing an image to be formed on a sheet, so as to change a position of the image.

BRIEF DESCRIPTION OF THE DRAWINGS

Exemplary embodiment(s) of the present disclosure will be described in detail based on the following figures, wherein:

FIG. 11 is a diagram showing correctable conditions;

DETAILED DESCRIPTION

Figure 1:
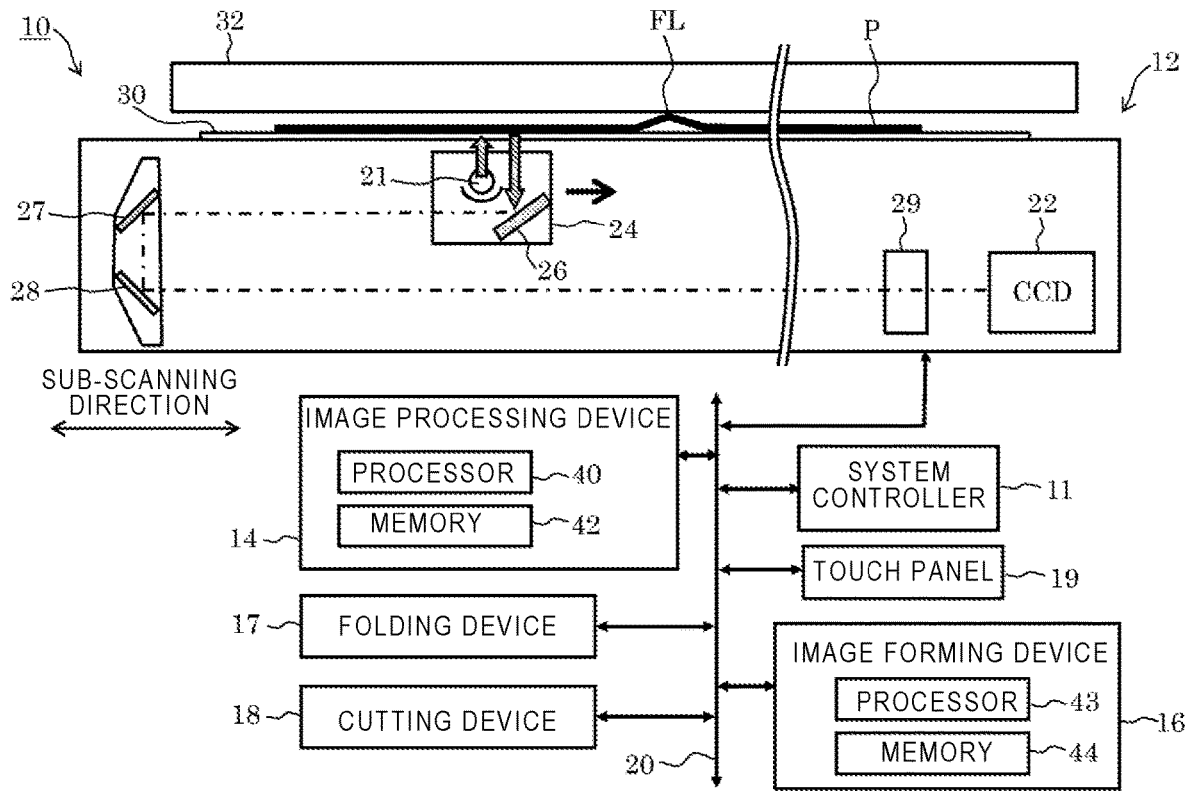
FIG. 1 is a block diagram showing a configuration of a system according to each exemplary embodiment of the present disclosure.

Hereinafter, each exemplary embodiment of the present disclosure will be described in detail with reference to the accompanying drawings. The configuration to be described below is merely an example for description, and may be appropriately changed in accordance with specifications of a system and a device and the like. When the following description contains plural exemplary embodiments and plural modifications, it is assumed from the beginning that characteristic parts of the exemplary embodiments and the modifications may be used in combination as appropriate. In all the drawings, the same elements are denoted by the same reference numerals, and repetitive descriptions thereof will be omitted.

FIG. 1 is a block diagram showing a configuration of a system 10 according to each exemplary embodiment of the present disclosure. The system 10 includes a system controller 11, an image reading device 12, an image processing device 14, an image forming device 16, a folding device 17, a cutting device 18, and a touch panel 19, which are electrically connected to one another via a bus 20. The system 10 is installed in, for example, a printing company, an office, or the like. The system 10 is connected to a network such as a LAN. The system 10 provides a print function, a copy function, a sheet folding function, a cutting function, and the like by the system controller 11 receiving a job from the outside via the network or receiving an operator's instruction input through the touch panel 19. The system 10 has a function of obtaining a positional deviation amount of a folding line of a test sheet P folded by the folding device 17 and changing, based on the obtained positional deviation amount, a position of an image formed on a folded sheet during creation of a printed matter.

The system controller 11 includes a processor and a memory which are not shown. The system controller 11 controls the entire system 10. The system controller 11 controls the image reading device 12, the image processing device 14, the image forming device 16, the folding device 17, and the cutting device 18 according to the job input from the outside, the instruction input from the operator through the touch panel 19, or the like. Alternatively, such control may be performed by a processor 40 of the image processing device 14 and a processor 43 of the image forming device 16.

The image reading device 12 may adopt various forms. FIG. 1 shows an example of a device configuration of the image reading device 12. The image reading device 12 includes a platen glass 30 on which a sheet is to be placed. During detection of the positional deviation amount of the folding line of the test sheet P, the test sheet P is unfolded and placed on the platen glass 30 as shown in FIG. 1.

The image reading device 12 includes a platen cover 32, an illumination unit 21, and a light receiver 22. The platen cover 32 presses the sheet onto the platen glass 30. The illumination unit 21 emits light to the sheet placed on the platen glass 30. The light receiver 22 is a charge coupled device (CCD) that receives reflected light from the sheet. The illumination unit 21 is mounted on a carriage 24 that moves in a sub-scanning direction (right and left directions in FIG. 1). The illumination unit 21 scans the sheet as the carriage 24 moves. The reflected light from the sheet is guided to the light receiver 22 via a mirror 26 mounted on the carriage 24, fixed mirrors 27, 28, and a lens 29. The light receiver 22 converts the reflected light into an electric signal to generate image information.

The image processing device 14 includes the processor 40 and a memory 42. The processor 40 operates according to a program stored in the memory 42. The memory 42 (also referred to as a storage) is, for example, a memory (for example, RAM, ROM, flash memory, and the like) including a semiconductor element, a hard disk, and the like, and stores programs, various data, and the like. The processor 40 obtains a positional deviation amount of a folding line FL by analyzing the image information obtained by reading the test sheet P with the image reading device 12. During creation of the printed matter, the processor 40 generates, based on the obtained positional deviation amount, sheet image information including image data representing an image to be formed on the sheet so as to change a position of the image. Details thereof will be described below.

The image forming device 16 is a device that forms an image on a sheet by an electrophotographic method, an inkjet recording method, or the like. The image forming device 16 includes the processor 43 and a memory 44. The processor 43 operates according to a program stored in the memory 44. The memory 44 (also referred to as a storage) is, for example, a memory (for example, RAM, ROM, flash memory, and the like) including a semiconductor element, a hard disk, and the like, and stores programs, various data, and the like. During the creation of the printed matter, the processor 43 obtains the sheet image information from the image processing device 14, and performs control so as to form the image on the sheet based on the sheet image information.

The folding device 17 is a device that performs a folding process such as a half fold, a Z-fold (an accordion fold), and a C-fold (a tri-fold). The cutting device 18 is a device that cuts the top, bottom, and edges of the sheet. A sheet transport path connects the image forming device 16, the folding device 17, and the cutting device 18 in this order. With this configuration, the sheet is transported from the image forming device 16 to the folding device 17 with an image formed on the sheet by the image forming device 16 or with no image formed, and the folding process is performed on the sheet. Similarly, the sheet is transported from the folding device 17 to the cutting device 18 with the sheet folded by the folding device 17 or without being folded, and a cutting process is performed on the sheet.

Next, creation of the test sheet P and obtaining of the positional deviation amount of the folding line on the test sheet P will be described in detail. The test sheet P (hereinafter, also simply referred to as a "sheet P") is a sheet that allows verification of the positional deviation amount of the folding line. The positional deviation amount of the folding line is a deviation amount of an actual folding line (which is a folding line actually formed by the folding device 17) from an expected folding line (which is a folding line to be expected). The test sheet P has, for example, the same size as sheets that constitute a printed matter to be created later. It is noted that the size of the test sheet P is not limited to the above.

Figure 2:
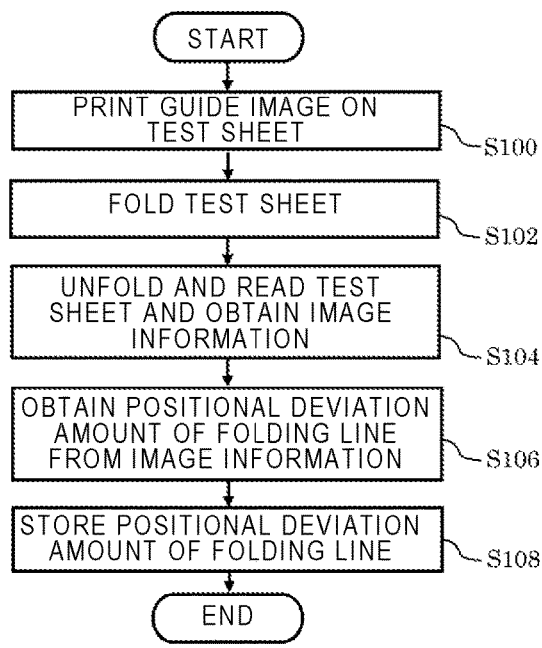
FIG. 2 is a flowchart of a process of obtaining a positional deviation amount of a folding line.

FIG. 2 is a flowchart of the creation of the test sheet P and the obtaining of the positional deviation amount of the folding line on the test sheet P. A flowchart of FIG. 2 is started when the operator operates the touch panel 19 and issues an adjustment start instruction.

Figure 3:
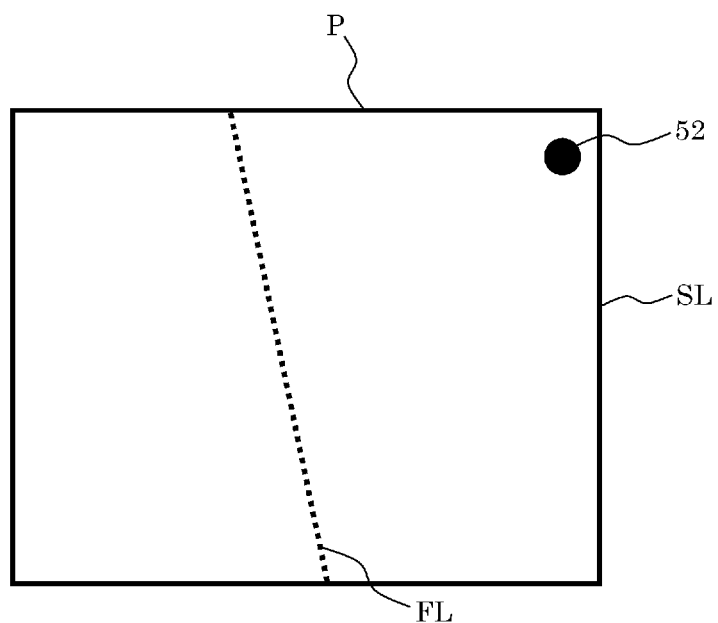
FIG. 3 is a diagram showing an example of a test sheet.

First, S100 and S102 in FIG. 2 are steps of creating the test sheet P. When the adjustment start instruction is issued through the touch panel 19, the system controller 11 receives the adjustment start instruction, and issues commands to cause the image forming device 16 to form a guide image on the sheet P (S100), and then cause the folding device 17 to fold the sheet P (S102). The guide image is information indicating an orientation in which the sheet P is placed on the platen glass 30 of the image reading device 12 when the sheet P is read by the image reading device 12 in S104 to be described below. FIG. 3 shows the folded test sheet P in an unfolded state. As an example of the guide image 52, a circle filled with black is drawn on a corner of the sheet P.

Upon receipt the command from the system controller 11, the image forming device 16 feeds the sheet P from a sheet feeding tray (not shown), and forms the guide image 52 on the sheet P (S100). At this time, the image forming device 16 may form a pattern image filled with black or the like in an area including a portion of the sheet P where the folding line FL is formed. Accordingly, when the sheet P is folded, a colorant of the filled pattern image is peeled off at a fold portion. Thus, the folding line FL easily appears in the image information obtained by reading the sheet P with the image reading device 12.

The sheet P on which the guide image 52 is formed is transported to the folding device 17 through the sheet transport path. The folding device 17 folds the transported sheet P (S102). At this time, the folding device 17 folds the sheet P such that a folding line is formed at a predetermined folding position. The predetermined folding position is a position of the expected folding line. The predetermined folding position is defined by a distance from a reference side SL that is a predetermined reference side of the sheet. In the exemplary embodiment, the expected folding line is parallel to the reference side SL. The predetermined folding position (hereinafter, referred to as a "position of an expected folding line") is stored in the memory of the system controller 11 in advance. The position of the expected folding line is transmitted from the system controller 11 to the folding device 17 at the same time as the command, and the folding device 17 receives and obtains the position. The folding device 17 folds the sheet P such that the folding line is formed at the position of the expected folding line. However, the position of the actually formed folding line (actual folding line FL) may deviate from the position of the expected folding line. Then, the folding device 17 discharges the folded sheet P to an external sheet discharge tray (not shown).

When discharging the folded sheet P, the folding device 17 notifies the system controller 11 of completion of the sheet discharge via the bus 20. Upon receipt of the notification from the folding device 17, the system controller 11 displays on the touch panel 19 that the creation of the test sheet P is completed. Accordingly, the creation of the test sheet P is completed.

Then, the system controller 11 displays a guide screen on the touch panel 19. The guide screen is a screen requesting an operator to input an adjustment continuation instruction through the touch panel 19 when he or she unfolds and places the discharged and folded sheet P on the platen glass 30 of the image reading device 12 and the sheet P is ready to be read.

According to the guide screen of the touch panel 19, the operator unfolds the discharged and folded sheet P as shown in FIG. 3 and places the sheet P on the platen glass 30 of the image reading device 12. At this time, the operator places the sheet P on the platen glass 30 such that the guide image 52 of the sheet P faces the platen glass 30 and is positioned on a predetermined side of the platen glass 30. In the exemplary embodiment, the sheet P is placed on the platen glass 30 such that the guide image 52 of the sheet P is positioned on an upper left portion of the platen glass 30. Specifically, it is assumed that, in the example shown in FIG. 3, the platen glass 30 is on a back side of the sheet P. In this case, the sheet P is turned over such that the left and right sides of the sheet P are switched, and the sheet P is placed on the platen glass 30. The operator places the sheet P away from an edge of the platen glass 30. Details of how to place the sheet P may be displayed on the touch panel 19 to guide the operator. Alternatively, or together therewith, the details of how to place the sheet P may be printed on the sheet P by the image forming device 16.

After placing the sheet P on the platen glass 30, the operator covers the sheet P as shown in FIG. 1 with the platen cover 32 from above and operates the touch panel 19 to issue the adjustment continuation instruction. Upon receipt of the adjustment continuation instruction from the operator through the touch panel 19, the system controller 11 issues a command to the image reading device 12 to cause the image reading device 12 to obtain the image information. Upon receipt of the command from the system controller 11, the image reading device 12 scans the sheet P by moving the carriage 24 in the sub-scanning direction, and obtains the image information on the sheet P (S104 in FIG. 2). After obtaining the image information, the image reading device 12 notifies the system controller 11 of completion of the obtaining via the bus 20. Upon receipt of the notification, the system controller 11 issues a command to the image processing device 14 to cause the image processing device 14 to obtain the positional deviation amount of the folding line of the sheet based on the image information.

Upon receipt of the command from the system controller 11, the processor 40 of the image processing device 14 obtains the image information from the image reading device 12, and stores the image information in the memory 42. Then, the processor 40 reads the image information from the memory 42, analyzes the image information, and obtains the positional deviation amount of the folding line FL of the sheet P (S106).

Figure 4:
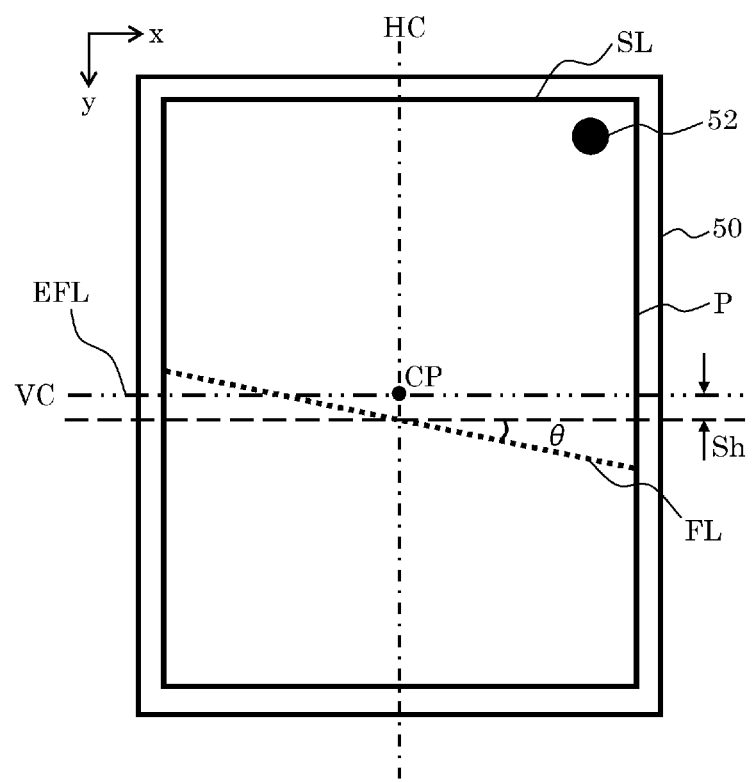
FIG. 4 is a diagram showing an example of image information obtained by reading the test sheet.

FIG. 4 is a diagram showing image information 50 obtained by reading the sheet P shown in FIG. 3 and rotated by 90 degrees to the right. The image information 50 is information including a large number of pixels arranged vertically and horizontally. A position of each pixel is specified by xy coordinates. In FIG. 4, coordinates of a pixel at an upper left corner are (x, y)=(0, 0), a horizontal direction is an x direction, and a vertical direction is a y direction. Since the sheet P is read in a state where the sheet P is placed away from the edge of the platen glass 30 as shown in FIG. 4, a contour line of the sheet P appears in the image information 50. In the exemplary embodiment, the processor 40 specifies two sheet sides extending in the x direction or a direction close to the x direction among the contour line (four sheet sides) of the sheet P appearing in the image information 50, and further specifies a sheet side having a smaller y coordinate among the two sheet sides as the reference side SL. Since the operator places the sheet P on the platen glass 30 according to the guide image 52 formed on the sheet P as described above, the reference side SL always appears on a constant side (the side with a smaller y coordinate in FIG. 4).

Next, the processor 40 obtains the position of the expected folding line EFL from the memory of the system controller 11. The position of the expected folding line EFL is defined by the distance from the reference side SL as described above. However, since the position is represented in actual size (actual physical distance), in order to specify the position of the expected folding line EFL in the image information 50, it is necessary to convert the position into the number of pixels. Then, the processor 40 converts the position (distance in actual size) of the expected folding line EFL into the number of pixels by dividing the distance in actual size of the expected folding line EFL by the actual size per pixel of the image information 50, which is obtained based on a reading resolution of the image reading device 12 and the like. Accordingly, the processor 40 can specify the position of the expected folding line EFL in the image information 50. In the example shown in FIG. 4, the expected folding line EFL is positioned in a center VC of the sheet P in up and down directions, and a center of the expected folding line EFL in a direction in which the expected folding line EFL extends coincides with a center CP of the sheet P. In FIG. 4, a center of the sheet P in the right and left directions is indicated by a symbol HC.

Next, the processor 40 specifies the position of the actual folding line FL (also simply referred to as the "folding line FL"), which is the actual folding line of the sheet P and appears in the image information 50. Then, the processor 40 obtains the positional deviation amount of the actual folding line FL from the expected folding line EFL (S106 in FIG. 2). Specifically, the processor 40 obtains, as the positional deviation amount, a translation deviation amount Sh and a rotation angle deviation amount θ. The translation deviation amount Sh is a distance between (i) the center (CP in FIG. 4) in the direction in which the expected folding line EFL extends and (ii) a position where (a) an imaginary line (HC in FIG. 4) that extends in a direction perpendicular to the direction in which the expected folding line EFL extends and (b) the actual folding line FL intersect. Since the translation deviation amount Sh is specified as the number of pixels in the image information 50, the processor 40 calculates an actual size of the translation deviation amount Sh by multiplying the number of pixels by the actual size per pixel. The rotation angle deviation amount θ is a magnitude of an inclination of the actual folding line FL with respect to the expected folding line EFL.

Next, in S108 of FIG. 2, the processor 40 stores the translation deviation amount Sh (actual size) and the rotation angle deviation amount θ in the memory 42. When the process of S108 is completed, the image processing device 14 notifies the system controller 11 of completion of the processing via the bus 20. Then, upon receipt of the notification, the system controller 11 displays on the touch panel 19 that the adjustment is completed. Accordingly, the operator can know that the adjustment is completed. Actually, during creation of the printed matter, the position of the image with respect to the folding line of the printed matter is adjusted using the translation deviation amount Sh and the rotation angle deviation amount θ.

In the exemplary embodiment described above, the test sheet P is read by the image reading device 12, to obtain the positional deviation amount of the folding line FL from the image information 50. Alternatively, for example, the operator may obtain the positional deviation amount of the folding line FL of the test sheet P using another device, instrument, or the like, and input the positional deviation amount into the system 10 by using the touch panel 19 or the like.

Figure 5:
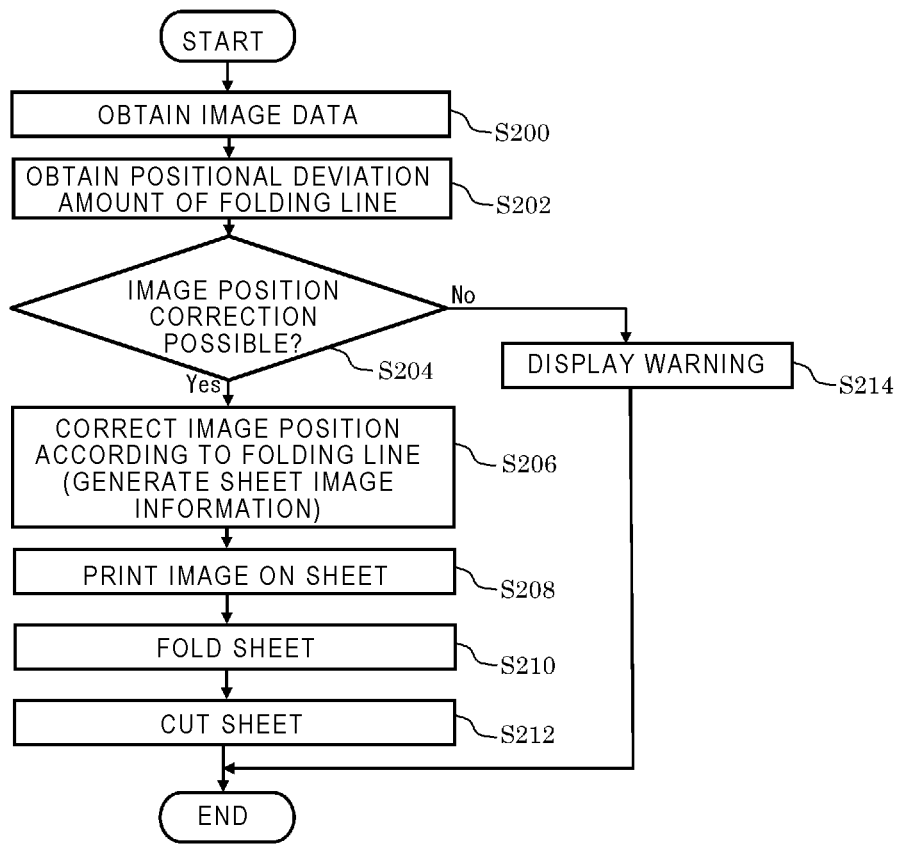
FIG. 5 is a flowchart a process of creating a printed matter.

Next, the creation of the printed matter will be described. FIG. 5 is a flowchart of a process of creating the printed matter. The flowchart of FIG. 5 is started when a job is input from the outside. The job is information including, for example, image data, an image forming position, a sheet folding position, a cutting position, and the like.

When the job is input from the outside, the system controller 11 receives the job, stores the job in the memory of the system controller 11, and transmits the job to the image processing device 14 to cause the image processing device 14 to generate the sheet image information.

Upon receipt of the command from the system controller 11, the processor 40 of the image processing device 14 first obtains the job including the image data in S200 of FIG. 5. The processor 40 stores the obtained job in the memory 42 and appropriately reads and uses the job in S204 and S206 to be described below.

Next, in S202, the processor 40 of the image processing device 14 reads and obtains the translation deviation amount Sh and the rotation angle deviation amount θ stored in the memory 42. Then, in S204, the processor 40 confirms whether position adjustment (also referred to as "position correction") of an image with respect to the folding line FL is possible. The confirmation is made based on a size of the image which is formed on the sheet according to the image data, the translation deviation amount Sh, and the rotation angle deviation amount θ. Details will be described below.

If the position adjustment of the image with respect to the folding line FL is possible (S204: Yes), the processor 40 proceeds to S206. In S206, the processor 40 generates the sheet image information based on the image data and the image forming position contained in the job, the translation deviation amount Sh, and the rotation angle deviation amount θ. The sheet image information is image information on the entire sheet, the entire image formable area of the sheet, or an area that is a part of the image formable area and that includes the image data.

Figure 6:
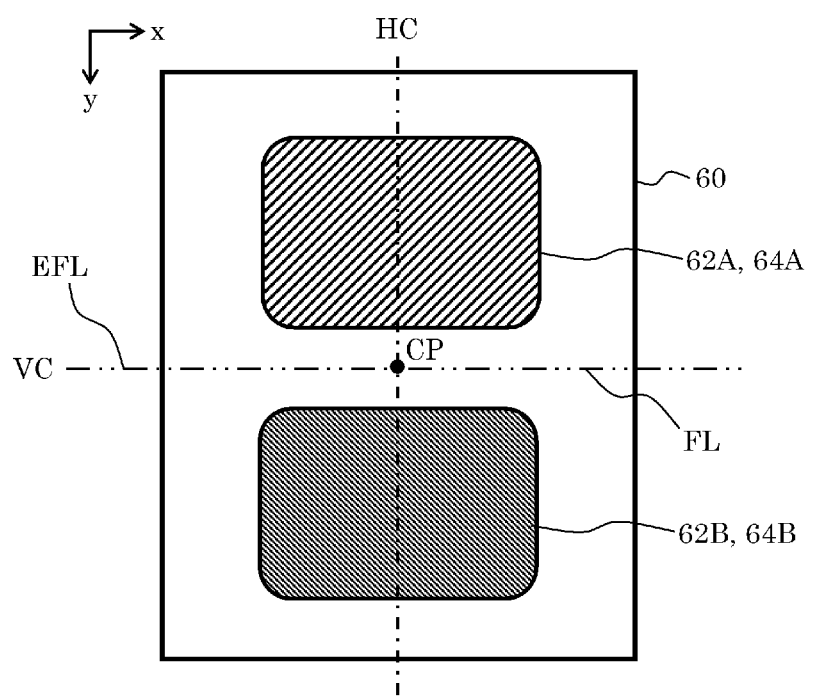
FIG. 6 is a diagram showing an example of sheet image information when a position of the folding line is not deviated.

FIG. 6 is a diagram showing an example of sheet image information 60 on the entire sheet generated according to the job when the translation deviation amount Sh and the rotation angle deviation amount θ are both 0 (zero). The job defines generating the sheet image information, forming images 64A, 64B on the sheet based on the sheet image information, folding the sheet on which the images 64A, 64B are formed, and creating a printed matter by cutting the top, bottom, and edges of the sheet. The job also defines that the image data includes upper image data 62A and lower image data 62B, and for the image forming position, the upper image 64A and the lower image 64B formed on the sheet based on the upper image data 62A and the lower image data 62B are arranged vertically symmetrically with respect to the folding line FL. The upper image 64A and the lower image 64B both have a rectangular shape with rounded corners, and have the same shape and the same size. The folding position defined in the job, that is, the expected folding position (expected folding line EFL) is located at the center VC of the sheet in the up and down directions, and the center of the expected folding line EFL in the direction in which the expected folding line EFL extends coincides with the center CP of the sheet.

The sheet image information is information including a large number of pixels arranged vertically and horizontally. A position of each pixel is specified by the xy coordinates. In the sheet image information 60 in FIGS. 6 and 7A and sheet image information 61 in FIG. 7B to be described later, coordinates of the pixel at the upper left corner are (x, y)=(0, 0), the horizontal direction is the x direction, and the vertical direction is the y direction.

As shown in FIG. 6, when the translation deviation amount Sh and the rotation angle deviation amount θ are both 0, the folding position (that is, the position of the expected folding line EFL) included in the job coincides with or is very close to a position actually folded by the folding device 17 (that is, the position of the actual folding line FL). In this case, the processor 40 may simply generate the sheet image information 60 according to the job.

Figure 7A:
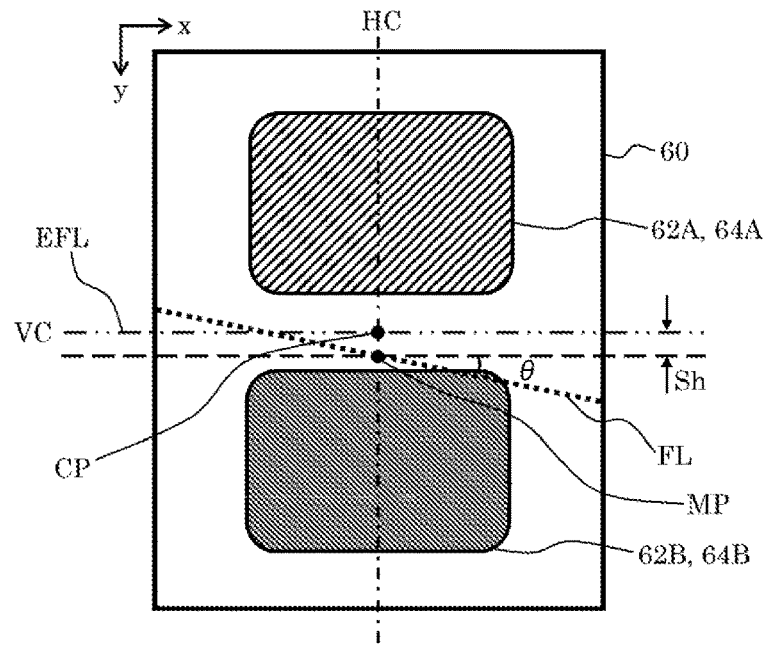
FIGS. 7A and 7B are diagrams showing an example of sheet image information when the position of the folding line is deviated.
Figure 7B:
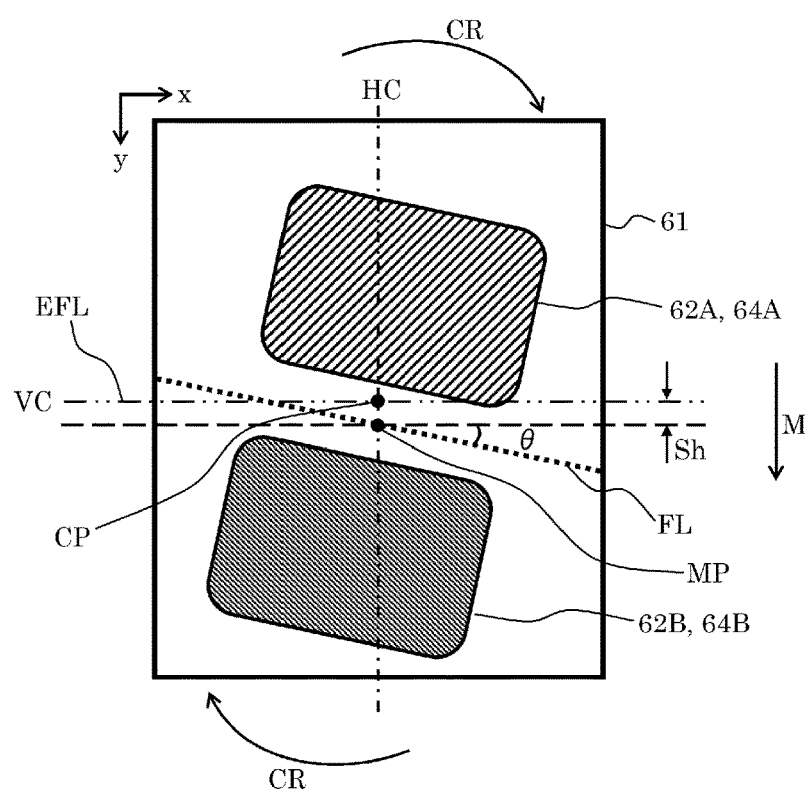

FIG. 7B is a diagram showing an example in which both the translation deviation amount Sh and the rotation angle deviation amount θ are not 0. In this case, as shown in FIG. 7A, the folding position (that is, the expected folding line EFL) included in the job and the position actually folded by the folding device 17 (that is, the position of the actual folding line FL) are deviated from each other. When at least one of the translation deviation amount Sh or the rotation angle deviation amount θ is not 0 as shown in FIG. 7A, the processor 40 generates the sheet image information 61 such that a positional relationship among the expected folding line EFL, the upper image 64A and the lower image 64B, which are defined in the job, is maintained among the actual folding line FL on the actual sheet, the upper image 64A, and the lower image 64B as shown in FIG. 7B.

Specifically, the processor 40 translates the upper image data 62A and the lower image data 62B in a direction (that is, the y direction in FIG. 7A) perpendicular to the direction in which the expected folding line EFL extends, as shown by an arrow M in FIG. 7B, from the positions of the upper image data 62A and the lower image data 62B shown in FIG. 7A by the translation deviation amount Sh. At this time, since the translation deviation amount Sh read from the memory 42 is the actual size, the translation deviation amount Sh is converted into the number of pixels corresponding to the translation deviation amount Sh (in the actual size), and the upper image data 62A and the lower image data 62B are moved by the number of pixels.

Then, the processor 40 rotates the upper image data 62A and the lower image data 62B by the rotation angle deviation amount θ about a position MP as shown by an arrow CR in FIG. 7B. The position MP is apart from the center (that is, the center CP on the sheet in FIG. 7A) of the expected folding line EFL by the translation deviation amount Sh in the direction (that is, the y direction) perpendicular to the direction in which the expected folding line EFL extends. Accordingly, the sheet image information 61 is obtained.

In the above description, the upper image data 62A and the lower image data 62B are translated and then rotated. Alternatively, the upper image data 62A and the lower image data 62B may be rotated and then translated. Specifically, the processor 40 rotates the upper image data 62A and the lower image data 62B by the rotation angle deviation amount θ from the positions of the upper image data 62A and the lower image data 62B shown in FIG. 7A about the center (that is, the center CP of the sheet in FIG. 7A) of the expected folding line EFL, as shown by the arrow CR in FIG. 7B. Then, the processor 40 translates the upper image data 62A and the lower image data 62B by the translation deviation amount Sh in the direction (that is, the y direction in FIG. 7A) perpendicular to the direction in which the expected folding line EFL extends, as shown by the arrow M in FIG. 7B.

When the translation deviation amount Sh is not 0 and the rotation angle deviation amount θ is 0, the processor 40 may simply translate the upper image data 62A and the lower image data 62B. When the translation deviation amount Sh is 0 and the rotation angle deviation amount θ is not 0, the processor 40 may simply rotate the upper image data 62A and the lower image data 62B.

The processor 40 of the image processing device 14 stores the generated sheet image information in the memory 42. Upon generation of the sheet image information, the image processing device 14 notifies the system controller 11 of completion of the generation via the bus 20. Upon receipt of the notification, the system controller 11 issues a command to the image forming device 16 to cause the image forming device 16 to form an image on the sheet based on the sheet image information.

Upon receipt of the command from the system controller 11, the image forming device 16 obtains the sheet image information from the image processing device 14, and stores the sheet image information in the memory 44 of the image forming device 16. Then, the image forming device 16 feeds a sheet PS from the sheet feeding tray (not shown), reads the sheet image information from the memory 44, and forms the image on the sheet PS based on the sheet image information (S208 in FIG. 5).

Upon completion of the image formation, the image forming device 16 notifies the system controller 11 of the completion of the image formation via the bus 20. Upon receipt of the notification, the system controller 11 issues a command to the folding device 17 to cause the folding device 17 to fold the sheet PS. At this time, the system controller 11 transmits the folding position included in the job to the folding device 17. The sheet PS on which the image is formed by the image forming device 16 is transported from the image forming device 16 to the folding device 17 through the sheet transport path.

Figure 8:
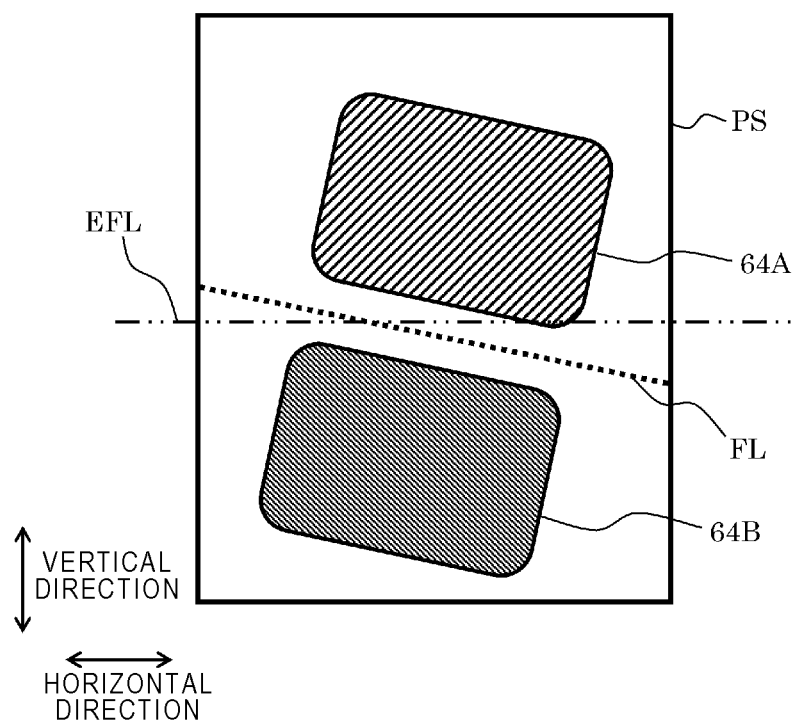
FIG. 8 is a diagram showing an example of a sheet on which an image is formed.

The folding device 17 receives the command and the folding position in the job from the system controller 11. The folding device 17 also receives the sheet PS on which the image is formed and which is transported through the sheet transport path. Then, the folding device 17 folds the sheet PS according to the folding position in the job (S210 in FIG. 5). At this time, the folding line FL actually formed on the sheet (that is, the actual folding line FL) is deviated from the folding position (expected folding line EFL) in the job by the translation deviation amount Sh and the rotation angle deviation amount θ or close amounts. FIG. 8 is a diagram showing the unfolded sheet PS which is obtained by forming the image on the sheet P based on the sheet image information 61 shown in FIG. 7B and then folding the sheet P by the folding device 17 to form the folding line FL. As shown in FIG. 8, the actual folding line FL is deviated from the position of the expected folding line EFL, but the positional relationship among the actual folding line FL, the upper image 64A, and the lower image 64B is the same as or substantially the same as the positional relationship among the expected folding line EFL, the upper image 64A, and the lower image 64B (see FIG. 6), which is defined in the job.

Upon completion of the folding of the sheet, the folding device 17 notifies the system controller 11 of the completion of the folding processing via the bus 20. Upon receipt of the notification, the system controller 11 issues a command to the cutting device 18 to cause the cutting device 18 to cut the sheet PS. At this time, the system controller 11 transmits the cutting position included in the job to the cutting device 18. The sheet PS folded by the folding device 17 is transported, in a folded state, from the folding device 17 to the cutting device 18 through the sheet transport path.

The cutting device 18 receives the command and the cutting position in the job from the system controller 11. The cutting device 18 also receives the folded sheet PS transported through the sheet transport path. Then, the cutting device 18 cuts the sheet PS according to the cutting position in the job (S212 in FIG. 5).

Figure 9:
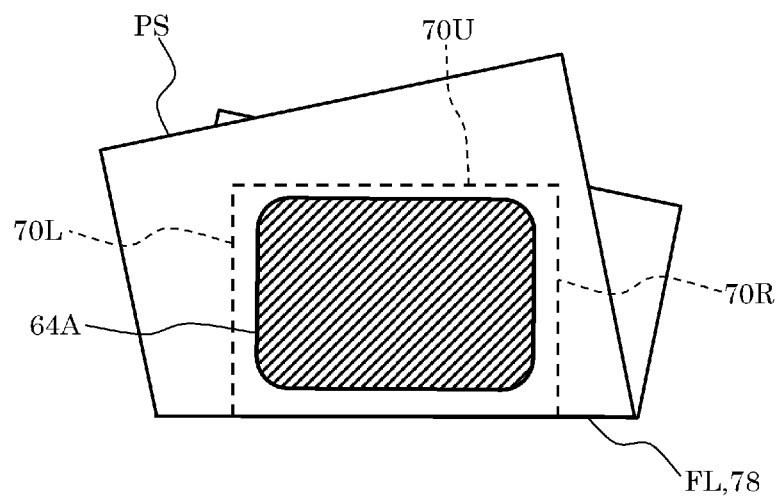
FIG. 9 is a diagram showing an example of a folded sheet and a cutting position.

FIG. 9 is a diagram showing the folded sheet PS which is obtained by forming the image on the sheet P based on the sheet image information 61 shown in FIG. 7B and then folding the sheet P by the folding device 17 to form the folding line FL. In FIG. 9, the cutting position is shown by a broken line. As shown in FIG. 9, the sheet on which the image is formed is half-folded, and the top, bottom, and edges are cut with a folding back 78 as a reference. Specifically, as shown in FIG. 9, the sheet PS is cut at positions of cutting lines 70L, 70R extending perpendicularly to the folding line FL and a cutting line 70U parallel to the folding line FL. The cut sheet PS is a half-folded sheet in which two folded pieces overlap. As described with reference to FIG. 8, the positional relationship among the actual folding line FL, the upper image 64A, and the lower image 64B is the same as or substantially the same as that defined in the job. Therefore, by cutting the sheet PS with the folding back 78 as the reference as shown in FIG. 9, a printed matter defined in the job or a printed matter similar to that defined in the job can be obtained.

Actually, when the position of the folding line FL of the sheet PS is deviated, a shape of the folded sheet PS before cutting is deviated from a shape intended in the job, so that the printed matter defined in the job may not be obtained when the sheet PS is cut at the cutting position in the job. Therefore, the cutting position may be adjusted based on the rotation angle deviation amount θ and the translation deviation amount Sh, and then the sheet PS may be cut. Alternatively, the folded sheet PS may be discharged to the outside before cutting, the operator may check the sheet PS and determine the cutting position, and then the sheet PS may be cut.

Figure 10:
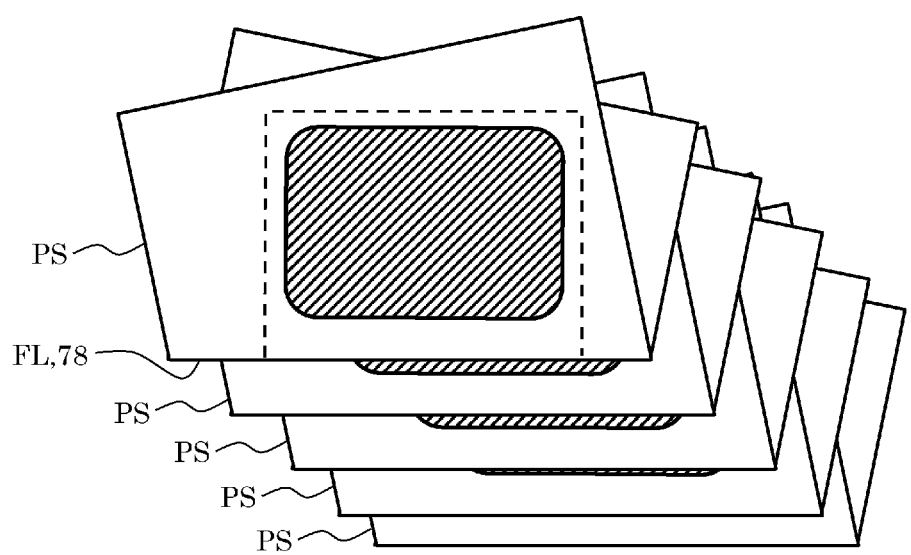
FIG. 10 is a diagram showing creation of the printed matter.

Furthermore, the cutting process may be performed in a state where plural folded sheets PS are stacked. As shown in FIG. 10, the plural folded sheets PS are stacked. Then, the folding backs 78 of the respective sheets PS are aligned, and the folded sheets PS are cut together. After the cutting, the folding backs 78 of the plural sheets PS are joined together to obtain a booklet as a printed matter.

Upon completion of the cutting, the cutting device 18 notifies the system controller 11 of the completion of the cutting via the bus 20. Then, upon receipt of the notification, the system controller 11 displays on the touch panel 19 that the creation of the printed matter is completed.

According to the exemplary embodiment described above, even when the folding position deviates from an expected position (that is, a position defined in the job), the positions of the images 64A, 64B are adjusted with respect to the actual folding line FL, so that a desired printed matter or a printed matter similar to the desired printed matter can be obtained. The folding line FL with respect to the images 64A, 64B is adjusted without adjusting the folding device 17.

Since the images 64A, 64B are rotated based on the rotation angle deviation amount θ of the folding line FL, a relative angle between the folding line FL and the images 64A, 64B is brought to be an expected angle (that is, an angle defined in the job) or be close to the expected angle.

Since the images 64A, 64B are translated based on the translation deviation amount Sh of the folding line FL, a relative distance between the folding line FL and the images 64A, 64B is brought to be an expected distance (that is, a distance defined in the job) or be close to the expected distance.

In the exemplary embodiment described above, the image data is rotated and translated to generate the sheet image information, to thereby rotate and translate the image formed on the sheet PS. Alternatively, when the sheet image information is generated according to the information defined in the job and the image forming device 16 forms an image on the sheet based on the sheet image information, the image formed on the sheet PS may be rotated and translated by changing an image forming operation. Specifically, the processor 43 of the image forming device 16 first obtains the translation deviation amount Sh and the rotation angle deviation amount θ as the positional deviation amount of the folding line FL. Then, when the image is formed on the sheet PS using the sheet image information which is generated according to the job, the processor 43 controls, based on the translation deviation amount Sh and the rotation angle deviation amount θ, the image forming operation so as to change a position of the image formed on the sheet PS. For example, when the image forming device 16 is an electrophotographic printing device, the processor 43 controls an exposure position with respect to a photoconductor drum based on the translation deviation amount Sh and the rotation angle deviation amount θ, so as to change the position of the image formed on the sheet PS. For example, when the image forming device 16 is an inkjet printing device, the processor 43 controls, based on the translation deviation amount Sh and the rotation angle deviation amount θ, a timing at which ink droplets are ejected from nozzles, so as to change the position of the image formed on the sheet PS.

In the exemplary embodiment described above, the images formed on the half-folded sheet PS are rotated and translated. Alternatively, images formed on a tri-folded or quad-folded sheet PS having two or more folding lines FL may be rotated and translated. For example, the rotation angle deviation amount θ and the translation deviation amount Sh of each folding line FL are obtained, and for each folding line FL, (i) images that are formed on both sides of the folding line FL so as to straddle the folding line FL or (ii) an image on one side of the folding line FL is rotated and translated based on the rotation angle deviation amount θ and the translation deviation amount Sh.

When the folding device 17 forms two or more folding lines FL on the sheet PS, the rotation angle deviation amount θ and the translation deviation amount Sh of each folding line FL may be substantially the same or close to each other. That is, a similar tendency of positional deviation may appear on each folding line FL. Therefore, for example, when images are formed on the sheet PS that is to have plural folding lines FL, the rotation angle deviation amount θ and translation deviation amount Sh of a specific folding line FL may be simply obtained, and the images on both sides of each of all the folding lines FL or the image on one side of each folding line FL may be rotated and translated based on the rotation angle deviation amount θ and the translation deviation amount Sh.

Next, a process of confirming whether image position correction is possible in S204 of FIG. 5 will be described. In the following description, "correction" has the same meaning as "adjustment", and "printing" has the same meaning as "image formation". In a case where the positional deviation amount of the folding line FL is large, when at least one of the corrections, that is, at least one of the rotating of the image or the translating of the image is performed, the corrected image may reside beyond a printable area of the sheet PS. If the image resides beyond the printable area, the image position correction cannot be performed. Therefore, in this case, the processor 40 determines that the image position correction cannot be performed (S204: No), and notifies the system controller 11 of that fact via the bus 20. Upon receipt of the notification, the system controller 11 displays a warning on the touch panel 19 that the printed matter cannot be created due to the deviation of the folding position in S214, and the process ends. Accordingly, the operator can know that the folding device 17 needs to be adjusted. In a case where the folding device 17 has a function of automatically adjusting the folding position, when a determination result in S204 is No, the system controller 11 may issue a command to the folding device 17 to cause the folding device 17 to adjust the folding position. Upon receipt of the command, the folding device 17 may automatically adjust the folding position. The control for issuing the warning may be performed by the processor 40 of the image processing device 14.

Figure 12:
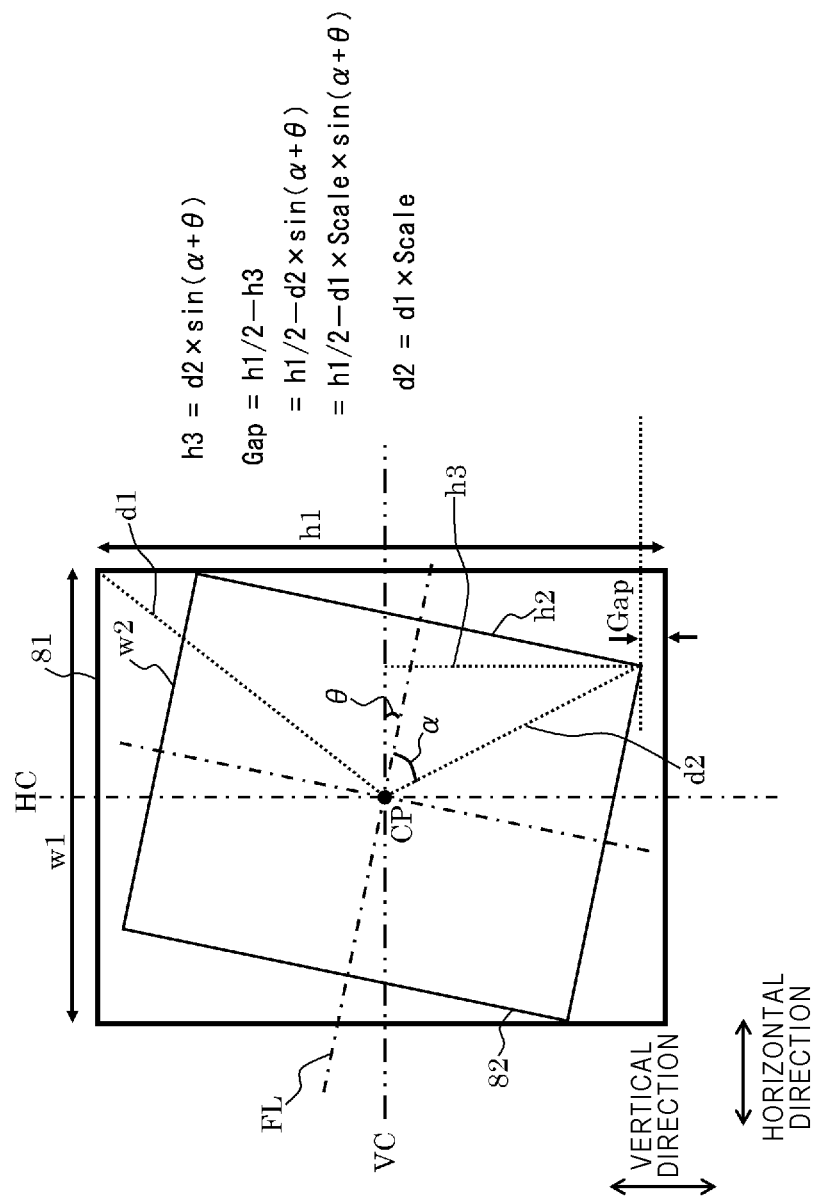
FIG. 12 is a diagram showing the correctable conditions.
Figure 13:
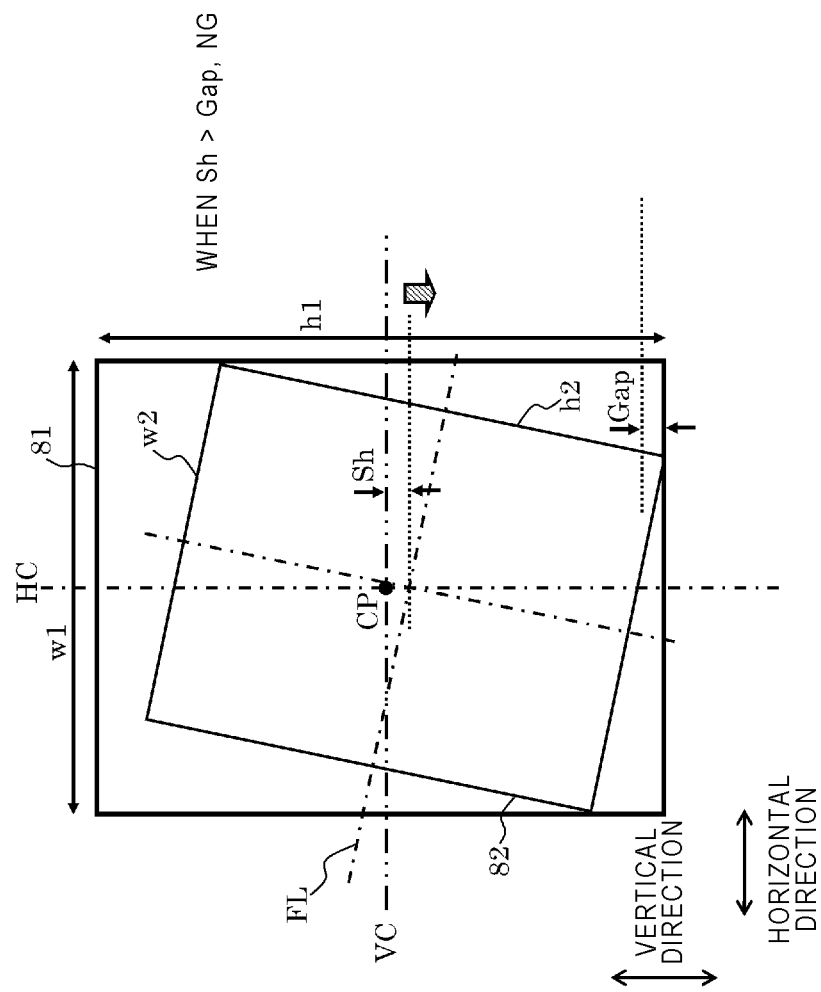
FIG. 13 is a diagram showing the correctable conditions.

Here, correctable conditions under which it is possible to perform the image position correction and which is used in the determination of S204 will be described. FIGS. 11 to 13 are diagrams showing the correctable conditions. FIG. 11 shows a printable area 81 of the sheet, a printable area 82 after the image position correction (hereinafter referred to as the "corrected printable area 82"), and a print image area 83 that is an area of an image printed according to the image data. The printable area 81 of the sheet is the same as the entire area of the sheet when an image can be printed up to edges of the sheet. A shape of the print image area 83 changes according to the image to be printed.

In FIG. 11 and FIGS. 12 and 13 which will be described later, a direction along a short side (that is, a side extending in the right and left directions of the figure) of the printable area 81 of the sheet is a horizontal direction, a direction along a long side (that is, a side extending in the up and down directions in the figure) of the printable area 81 of the sheet is the vertical direction, a center of the printable area 81 of the sheet is CP, a center in the horizontal direction of the printable area 81 of the sheet is HC, and a center in the vertical direction of the printable area 81 of the sheet is VC.

FIG. 11 shows a case where the rotation angle deviation amount θ is not 0 but the translation deviation amount Sh is 0. As shown in FIG. 11, when a print image is corrected by rotating the print image according to the rotation angle deviation amount θ, a range (that is, the corrected printable area 82) where the corrected print image can be printed is narrower than the printable area 81 of the sheet. Therefore, when an area of the print image (that is, the print image area 83) is large, the print image resides beyond the corrected printable area 82 (that is, beyond the printable area 81 of the sheet). Therefore, the image position correction is impossible. FIG. 11 shows that for the rotation angle deviation amount θ, how large the print image area 83 that makes the image position correction impossible is.

As can be seen from FIG. 11, a half-length d2 of a diagonal line of the corrected printable area 82 is calculated by the following Equation (1) based on a short side length w1 of the printable area 81 of the sheet, an angle α of a diagonal line of the printable area 81 of the sheet with respect to the imaginary line VC, and the rotation angle deviation amount θ.

$$d2 = w1/(2 \times \cos(\alpha - \theta)) \quad (1)$$

A ratio "Scale" of the half-length d2 of the diagonal line of the corrected printable area 82 to a half-length d1 of the diagonal line of the printable area 81 of the sheet is calculated by the following Equation (2).

$$\text{Scale} = d2/d1 = w1/(2 \times d1 \times \cos(\alpha - \theta)) \quad (2)$$

Here, Scale indicates a ratio of a size of the corrected printable area 82 to a size of the printable area 81 of the sheet. A short side length w2 of the corrected printable area 82 can be calculated by the following Equation (3).

$$w2 = \text{Scale} \times w1 \quad (3)$$

When a short side length Imgx of the print image area 83 is larger than w2 derived from the above Equations (1) to (3), the print image area 83 resides beyond the corrected printable area 82. Therefore, the image position correction is impossible. That is, the following condition 1 needs to be satisfied as one of the correctable conditions of the image position correction.

$$\text{Imgx} \leq w2 \quad \text{(condition 1)}$$

As shown in FIGS. 12 and 13, in a case where the print image is corrected by translating the print image according to the translation deviation amount Sh, when the translation deviation amount Sh is large, the corrected printable area 82 may reside beyond the printable area 81 of the sheet, and the image position correction may be impossible. Actually, even in this case, the image position correction is possible as long as the area of the print image (that is, the print image area 83, see FIG. 11) resides within the printable area 81 of the sheet. However, in order to easily determine whether the image position correction can be performed, it is determined here that the image position correction cannot be performed when the corrected printable area 82 resides beyond the printable area 81 of the sheet.

As shown in FIG. 12, the shortest distance in the vertical direction between a contour line of the corrected printable area 82 and a contour line of the printable area 81 of the sheet is defined as "Gap". As can be seen from FIG. 12, Gap is calculated by the following Equation (4) based on a long side length h1 of the printable area 81 of the sheet, the half-length d1 of the diagonal line of the printable area 81 of the sheet, Scale, the angle α (which is the same as the angle α shown in FIG. 11) of the diagonal line of the corrected printable area 82 with respect to the folding line FL, and the rotation angle deviation amount θ.

$$\text{Gap} = h1/2 - d1 \times \text{Scale} \times \sin(\alpha + \theta) \quad (4)$$

As shown in FIG. 13, when the translation deviation amount Sh is larger than Gap derived from the above Equation (4), the corrected printable area 82 resides beyond the printable area 81 of the sheet. Therefore, it is determined that the image position correction is impossible. That is, the following condition 2 needs to be satisfied as another one of the correctable conditions of the image position correction.

$$Sh \leq \text{Gap} \quad \text{(condition 2)}$$

In S204 of FIG. 5, the processor 40 of the image processing device 14 determines, using the above-described equations and conditions, whether the image position correction can be performed. Specifically, the processor 40 determines that the image position correction is possible when both of the condition 1 and condition 2 are satisfied (S204: Yes), and determines that the image position correction is impossible when one or both of the above condition 1 and condition 2 are not satisfied (S204: No).

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing device comprising:
   a processor configured to
      prior to forming an image on a sheet, obtain a positional deviation amount of an actual folding line from an expected folding line on a test sheet, the test sheet different from the sheet, and
      generate, based on the positional deviation amount, sheet image information including image data representing an image to be formed on a sheet, the image data providing for the image to be formed in an orientation and location consistent with the positional deviation amount of the actual folding line from the expected folding line.

2. The image processing device according to claim 1, wherein the positional deviation amount includes a rotation angle deviation amount of the actual folding line from the expected folding line, and the processor is configured to rotate the image data based on the rotation angle deviation amount to generate the sheet image information.

3. The image processing device according to claim 2, wherein the positional deviation amount further includes a translation deviation amount of the actual folding line from the expected folding line, and the processor is configured to translate the image data based on the translation deviation amount to generate the sheet image information.

4. The image processing device according to claim 3, wherein when at least one of the rotating of the image data or the translating of the image data results in the image residing beyond a printable area of the sheet, the processor performs control such that a warning is issued.

5. An image forming device obtaining sheet image information from the image processing device according to claim 1, and forming the image on the sheet based on the sheet image information.

6. An image forming device comprising:

a processor configured to prior to forming an image on a sheet, obtain a positional deviation amount of an actual folding line from an expected folding line on a test sheet, the test sheet different from the sheet, and control, based on the positional deviation amount, an operation of forming an image on a sheet, the image being formed in an orientation and location consistent with the positional deviation amount of the actual folding line from the expected folding line.

7. The image forming device according to claim 5, wherein the sheet on which the image is formed is folded into a half fold and cut with a folding back as a reference.

8. The image forming device according to claim 6, wherein the sheet on which the image is formed is folded into a half fold and cut with a folding back as a reference.

9. An image processing device comprising:

means for prior to forming an image on a sheet, obtaining a positional deviation amount of an actual folding line from an expected folding line on a test sheet, the test sheet different from the sheet, and generating, based on the positional deviation amount, sheet image information including image data representing an image to be formed on a sheet, the image data providing for the image to be formed in an orientation and location consistent with the positional deviation amount of the actual folding line from the expected folding line.

* * * * *